United States Patent Office 3,746,612
Patented July 17, 1973

3,746,612
REMOVAL OF SODIUM CHLORIDE FROM WHITE PULPING LIQUOR
William H. Rapson, Scarborough, Ontario, and Douglas W. Reeve, Toronto, Ontario, Canada, assignors to Erco Envirotech Ltd., Islington, Ontario, Canada
Filed Dec. 22, 1970, Ser. No. 100,669
Claims priority, application Canada, Dec. 30, 1969, 63,172
Int. Cl. D21c 11/12
U.S. Cl. 162—17       27 Claims

ABSTRACT OF THE DISCLOSURE

A white liquor for a pulping process having a reduced sodium chloride-content is prepared by subjecting dilute white liquor to concentration to deposit sodium chloride therefrom.

---

Figure 1:
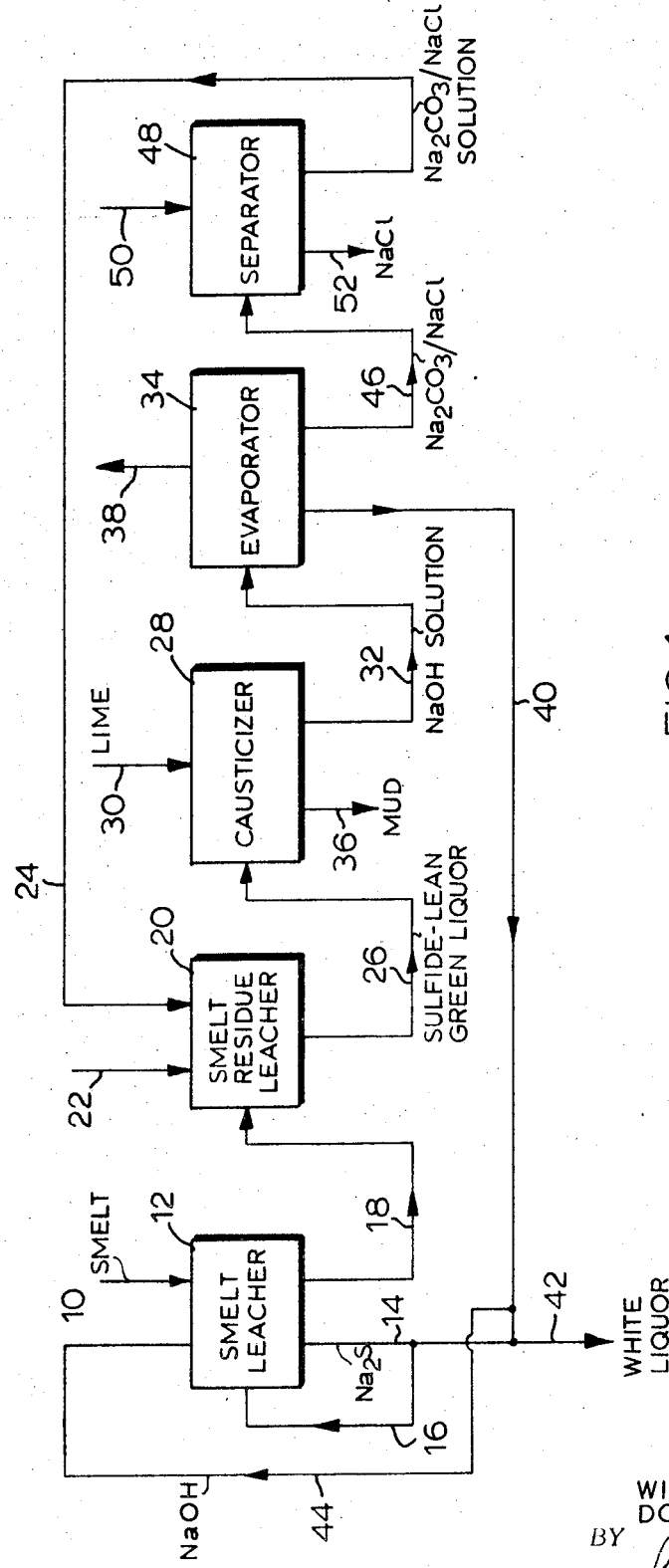

This invention relates to the recovery of chemicals from the pulping of cellulosic fibrous material and more particularly to improved efficiency in the operation of pulp mills.

The invention will be described particularly with reference to the Kraft mill process but the invention is not limited thereto. The operations described below readily may be integrated with other pulping processes, for example, the alkafide, sodium base-sulfite, cold alkali refining prehydrolysis kraft, soda, polysulfide and holopulping processes.

In pulping operations, the raw cellulosic fibrous material, generally wood chips, is digested in a pulping liquor, generally known as a "white liquor." This latter term is used in this specification generally to refer to liquors containing dissolved sodium hydroxide. After the digestion step, the pulp is separated from spent pulping liquor, known as "black liquor."

In the normal Kraft process, the cellulosic fibrous material, generally wood chips, is digested by heating with a white liquor containing sodium sulfide and sodium hydroxide to dissolve from the wood chips a substantial part of the hemicelluloses and lignin therein. The fibrous material so produced is separated from the resulting black liquor, washed in a brown stock washer, and, thereafter, may be passed to a bleaching process.

The black liquor is subjected to a series of operations in a recovery system. The black liquor first is concentrated by evaporation of water and the concentrated black liquor is burned in a furnace to yield a smelt containing sodium carbonate and sodium sulfide. The smelt is dissolved in water to yield a raw green liquor which then is clarified. The dregs resulting from the clarification, generally consisting of insoluble salts of metal cations other than sodium and potassium, are washed with water.

The clarified green liquor is causticized with slaked lime whereby the sodium carbonate is converted to sodium hydroxide and calcium carbonate is precipitated as a mud. The mud is washed with water and calcined to regenerate lime for further causticization. The causticized green liquor then is recycled as white liquor to the digester. The wash water from the dregs and the mud usually is used as water for dissolving the smelt.

Sodium sulfate is added to the recovery operation to provide make-up sodium and sulfur values to the system. Generally the sodium sulfate is added to the black liquor before it is fed to the furnace. The sodium sulfate forms in the furnace sodium sulfide and sodium carbonate, the sodium carbonate being converted to sodium hydroxide on later causticization. In this manner, the sodium hydroxide and sodium sulfide content of the white liquor is maintained at the desired level.

In coastal regions, logs from which the wood chips are formed are floated in sea water and the logs soak up a certain quantity of salts, especially sodium chloride. The sodium chloride is introduced into the pulping operation with the wood chips. While a certain amount of the sodium chloride may be removed by washing with fresh water, it is not possible to remove all of the sodium chloride by such washing, so that some sodium chloride is inevitably introduced into the pulping system.

In addition, sodium chloride may be introduced into the recovery system by the use of well water and use of chloride containing make-up chemicals which are effluents of other plants. In a preferred aspect of the present invention, sodium chloride also is introduced into the recovery system with bleach plant effluent.

The sodium chloride passes without change through the black liquor recovery operations and recycles in the white liquor, and, therefore, constitutes a dead load in the system. The quantity of sodium chloride builds up in the system with each recycle to a particular steady state concentration which depends on the efficiency of the recovery system. In accordance with the present invention, the sodium chloride in recycled white liquor is partially or completely removed by subjecting a white liquor to concentration, whereby sodium chloride is precipitated from the liquor. The white liquor so subjected to concentration may be, in certain embodiments, substantially free from sodium sulfide.

The degree of concentration necessary for any given white liquor depends on a number of factors, such as the sodium chloride content and the hydroxide and sulfide contents of the white liquor. The quantity of sodium chloride precipitated on concentration depends, among other factors, on the quantity of sodium chloride present in the liquor, the temperature and the hydroxide and sulfide content of liquor.

As indicated above, the white liquor which is concentrated in accordance with this invention may be substantially sulfide free. A sulfide-lean white liquor may be formed by fractionation of a smelt formed in the black liquor smelt operation, to remove sodium sulfide values therefrom. Such fractionation may be achieved in a number of ways, for example, the smelt may be leached with water, or recycled sodium sulfide solution to dissolve preferentially sodium sulfide and leaving solid sodium carbonate and sodium chloride. The solid materials remaining then are utilized to form the green liquor. Fractionation of sodium chloride-containing smelts constitutes the invention of copending application Ser. No. 99,968, filed Dec. 21, 1970.

Fractionation of the smelt may be achieved in other manners. In one such alternative, sodium sulfide-lean white liquor, after concentration to precipitate sodium chloride therefrom, may be utilized to fractionate the sodium sulfide-containing smelt, to thereby form a sodium hydroxide- and sodium sulfide-containing white liquor, which may be used, optionally, after dilution, as pulping liquor in a Kraft mill. Where such fractionation occurs, more sodium chloride and sodium carbonate are deposited from the sulfide-lean white liquor as the sodium sulfide is dissolved in the white liquor.

The contact of a sodium sulfide-containing smelt by a relatively concentrated sodium hydroxide solution constitutes the invention of copending application Ser. No. 100,083, filed Dec. 21, 1970.

The smelt which is fractionated may be in several alternative forms, for example, the smelt may have been crushed after solidification, or comminuted while molten, i.e. "wooled" by using high velocity steam jets. The comminuted solidified smelt then is contacted with the water, recycled sodium sulfide solution or recycled sodium hydroxide solution to leach sodium sulfide therefrom.

Another manner of separating the sodium sulfide from the sodium carbonate and sodium chloride is to prepare the green liquor in the conventional manner and then evaporate water therefrom to precipitate sodium carbonate and sodium chloride.

The leaching of the sodium sulfide by the above-described methods may be conducted over a wide range of desired temperatures, generally from about 25° C. to about 130° C.

Where the fractionation of smelt occurs using water or recycled sodium sulfide solution to form an aqueous solution of sodium sulfide, it is preferred to carry out the fractionation to provide a sodium sulfide solution having a concentration of about 20 to 35 wt. percent $Na_2S$. Where such fractionation is carried out by leaching using recycled sodium hydroxide solution, then it is preferred that the concentration of $Na_2S + NaOH$ in the resultant solution be about 25 to 50 wt. percent.

When fractionation of the smelt is achieved using sodium sulfide solution or water, then the resulting sodium sulfide solution may be combined with the sulfide lean white liquor, which has been concentrated in accordance with the present invention to precipitate sodium chloride therefrom, to provide a pulping liquor, which may require dilution prior to use in a Kraft mill operation.

The solid mixture of sodium carbonate and sodium chloride remaining after leaching of the sodium sulfide from the smelt is dissolved in water to provide a green liquor. This green liquor may contain residual quantities of sodium sulfide not leached from the smelt and is termed "sulfide-lean" green liquor for this reason. The sulfide-lean green liquor is causticized to convert substantially the sodium carbonate-content thereof to sodium hydroxide to thereby provide a white liquor after removal of precipitated calcium carbonate.

The green liquor may be clarified prior to causticization to remove "heavy dregs" of the smelt. The "light" dregs of the smelt may be removed from the sodium sulfide solution.

The resulting white liquor containing sodium hydroxide is evaporated in accordance with the present invention to precipitate part of the sodium chloride content therefrom.

The resulting sulfide-lean and sodium chloride-lean white liquor may be combined with the sodium sulfide solution to provide concentrated white liquor which may require dilution prior to recycle to the digester. Alternatively, the white liquor may be used to fractionate the smelt in accordance with the invention of co-pending application Ser. No. 100,083.

The provision of a sodium sulfide-lean-green liquor in accordance with the inventions of co-pending applications Ser. Nos. 99,968 and 100,083 represents a preferred embodiment of the present invention, since such inventions have certain advantages as compared to the provision of a green liquor directly from the smelt, and therefore, containing the sodium sulfide content of the smelt as well as the sodium carbonate and sodium chloride content. Thus, smaller volumes of water to form the green liquor are required in the case of sulfide-lean green liquor to produce a given amount of sodium hydroxide. In this regard, it can be shown that the formation of sulfide-lean green liquor may reduce the volume of liquor, required to produce a given volume of sodium hydroxide to approximately 70 percent of that required for conventional green liquor.

In conventional green liquor some hydrolysis of the sodium sulfide content to sodium hydroxide occurs and the presence of this sodium hydroxide inhibits the causticization reaction. By the use of a sulfide-lean green liquor, this hydrolysis with consequent inhibition of the causticizing process is eliminated.

Generally, not all of the sodium carbonate is converted to sodium hydroxide upon causticization of green liquor, even in cases where the green liquor is sulfide-lean, although the efficiency of the causticization is improved in this case as compared to conventional green liquor. The unconverted sodium carbonate remaining after the causticization step represents a dead load in the system. Upon concentration of the white liquor in accordance with the present invention, the unconverted sodium carbonate is partially deposited from the white liquor along with the sodium chloride.

In order to separate pure sodium chloride from the mixture of sodium carbonate and sodium chloride precipitated upon concentration, preferably evaporation, of the white liquor the precipitated mixture may be leached with water whereby all of the sodium carbonate is dissolved together with part of the sodium chloride, thereby leaving pure sodium chloride.

Alternatively, the white liquor may be subjected to a two-stage evaporative crystallization. In the first stage pure sodium chloride is precipitated, and, as the evaporation continues, in the second stage a mixture of sodium carbonate and further sodium chloride is precipitated. This mixture may be dissolved in water to provide a solution of sodium carbonate and sodium chloride.

Any sodium sulfate which may be present in the white liquor may coprecipitate with the sodium chloride and sodium carbonate.

The solution of sodium carbonate and sodium chloride, formed by leaching of a precipitated mixture or from the precipitate of the second stage of a two-stage evaporative crystallization, may be recycled to dissolve the solid mixture of sodium carbonate and sodium chloride separated from the smelt, or to dissolve the smelt in the case where there is no initial fractionation of the smelt. Such recycle constitutes the invention of copending application Ser. No. 100,082, filed Dec. 21, 1970. In this way, while the concentration of sodium chloride in the white liquor, prior to evaporation, is increased as compared to the concentration in the white liquor without recycle, such further sodium chloride does not contaminate the remainder of the plant since it is precipitated on concentration of the white liquor.

As indicated above, the white liquor, after concentration to deposit part of the sodium chloride and sodium carbonate, may be fed to the smelt leacher to dissolve the sodium sulfide therein. Since the white liquor is saturated with respect to sodium chloride and sodium carbonate and sodium sulfide has a higher solubility than these materials, contact of the white liquor with the smelt causes not only sodium sulfide to dissolve but also sodium carbonate and sodium chloride to precipitate from the white liquor. The recycle of the sodium hydroxide solution as leach water for the smelt reduces the quantity of water required to be evaporated in the system and thereby reduces the cost per ton of pulp. In this way, the white liquor sent to the pulping operation contains less sodium chloride and sodium carbonate than after evaporation in accordance with the present invention, without the necessity of increased evaporation. The sodium chloride and sodium carbonate precipitated upon leaching of the smelt forms green liquor with the remainder of the smelt.

The Kraft mill operation may be integrated in accordance with a preferred embodiment of this invention with a bleach plant to eliminate liquid effluents from such plants. Bleach plants generally subject pulp to a series of operations to provide a bleached pulp suitable for use in the formation of end-products, such as paper. Typically, such series of operations includes one or more bleaching steps and one or more caustic extraction steps. Usually, the pulp is washed after each of these operations, so that spent wash water contains dissolved chemicals, including sodium chloride, and fibrous material removed from the pulp.

It has generally been the case that this spent wash water has been discharged to water bodies, such as streams, rivers, lakes and oceans, without any attempt to recover the chemicals, although in some instances solid particle recovery operations are included. However, one of the main reasons that no attempt has been made to recover these chemicals is because they are very dilute. The spent wash water is harmful to aquatic and marine biotia and polluting from the point of view of containing fibres and materials consuming oxygen present in the water. It is desirable to avoid such environmental pollution and this is achieved in accordance with this embodiment of the invention in the manner described below.

A particular bleach plant operation which has been employed involves an initial bleaching of the pulp with an aqueous solution containing chlorine and chlorine dioxide, an intermediate washing, a caustic extraction using aqueous sodium hydroxide solution, a further washing, a bleaching with an aqueous solution of chlorine dioxide, another washing, a further caustic extraction using aqueous sodium hydroxide solution, an additional washing, a final bleaching with aqueous chlorine dioxide solution and a final washing. This is the so-called CEDED operation. Alternatives of this operation are known and may be employed. It is preferred to provide a flow of wash water through the bleach plant which is countercurrent to the flow of the pulp. In such countercurrent operation spent wash water from one washing step is utilized as the wash water for the preceding washing step. The spent wash water from the washing of the pulp after the first bleaching step constitutes the bleach plant effluent (known as BPE).

The environmental problems posed by discharge of bleach plant effluent to water bodies are eliminated by using the effluent to provide at least part, preferably all, of the overall water requirement of the system of conversion of smelt to white liquor. Thus, the bleach plant effluent may be used to dissolve the smelt to form green liquor or to dilute already formed green liquor. Further, the effluent may be used to leach the precipitated mixture of sodium chloride and sodium carbonate from the concentration of the white liquor to dissolve the sodium carbonate and part of the sodium chloride. In addition, such effluent may be used to wash the calcium carbonate mud deposited in the causticization step, and to wash dregs. Further, the effluent water may be used to dilute the concentrated white liquor prior to recycle to the digester.

In this way the chemicals contained in the bleach plant effluent are retained within the mill and the pollutant effect of these materials is eliminated. In addition, fresh water requirements of the mill and the cost of water treatment are reduced.

The addition of water such as bleach plant effluent to the green liquor increases causticizing efficiency. This in turn improves sodium chloride recovery since the amount of sodium carbonate to be recycled is reduced. Water is evaporated during the concentration step and the condensed water may be returned to the bleach plant as wash water.

The sodium chloride recovered in the above-described operations may be used to generate chlorine dioxide and chlorine by reaction with sodium chlorate and sulphuric acid. It also may be used to generate sodium hydroxide or sodium chlorate by electrolysis.

Figure 2:
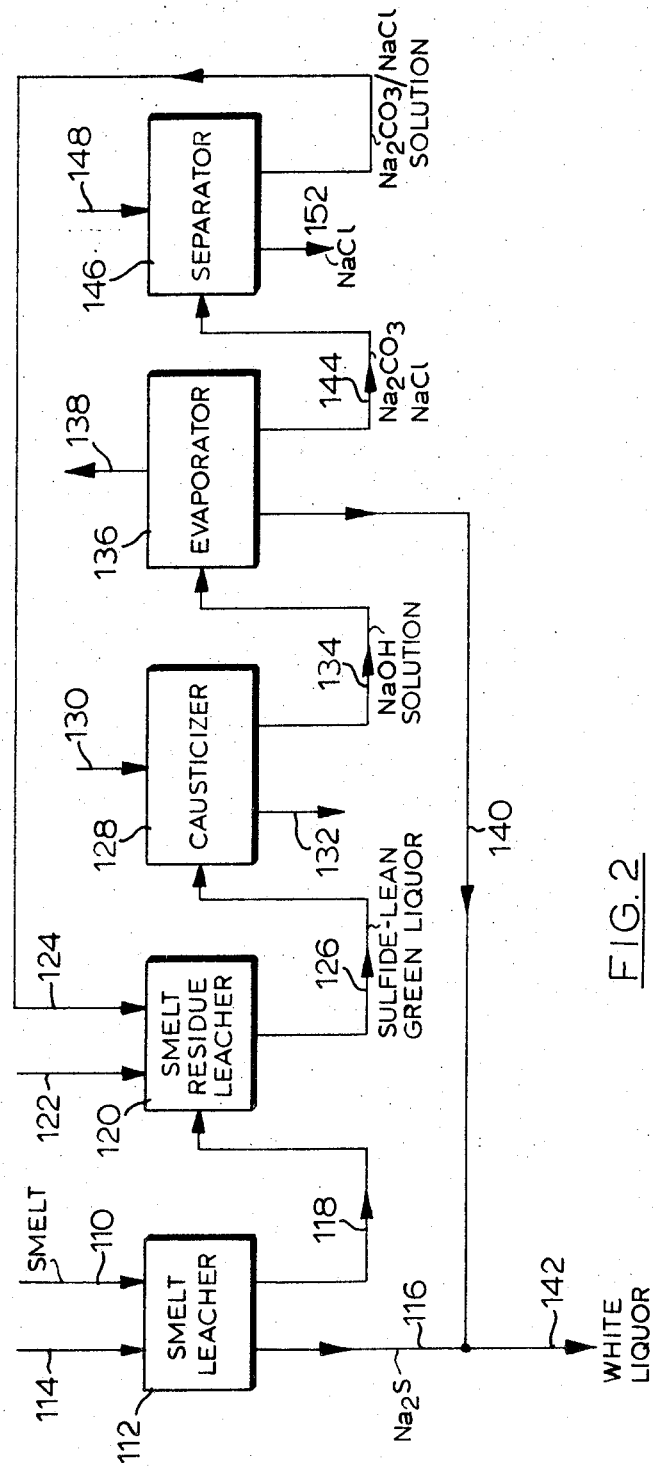
Figure 3:
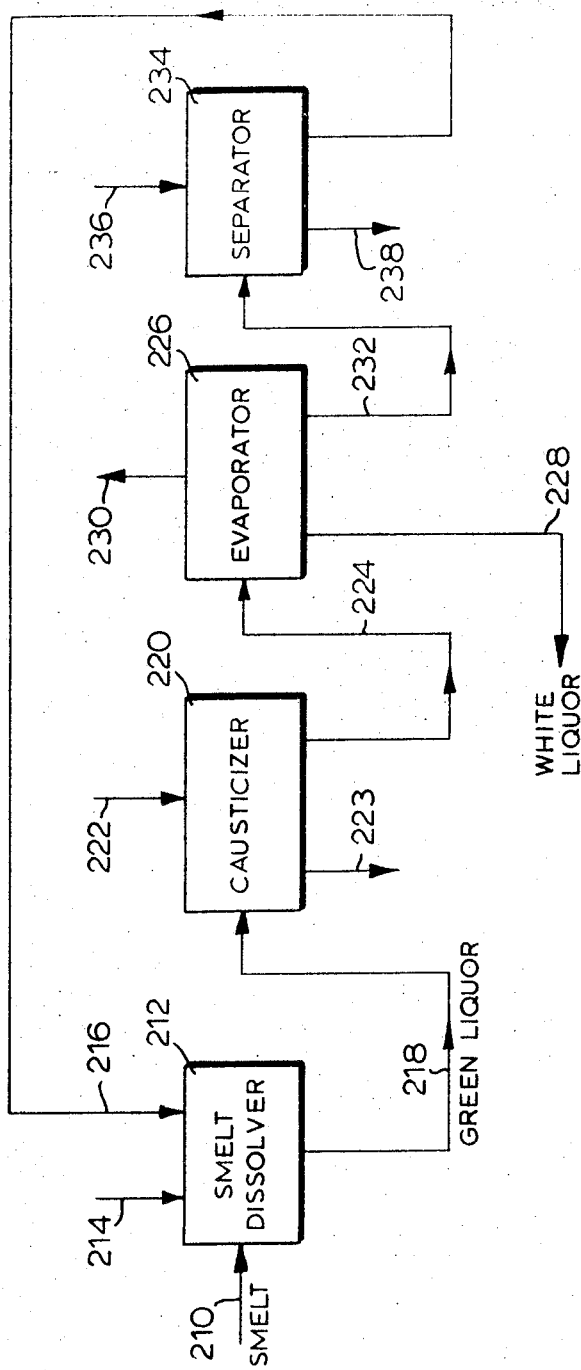

The present invention will be further described, by way of illustration, with reference to the accompanying drawings, in which, FIG. 1 is a schematic flow sheet of part of a Kraft pulp mill recovery system embodying the present invention;

FIG. 2 is a schematic flow sheet of part of an alternative Kraft pulp mill recovery system embodying the present invention; and FIG. 3 is a schematic flow sheet of part of a further Kraft pulp mill recovery system embodying the present invention.

There have been omitted from the drawings separators, washers, etc. in order to simplify the matter appearing therein.

With reference to FIG. 1, smelt from a furnace of a Kraft mill recovery system, including sodium sulfide, sodium chloride and sodium carbonate, is fed by line 10 to a smelt leacher 12. The smelt, which may be "wooled" by the action of steam, is leached with recycled sodium hydroxide solution.

The leaching of the smelt with recycled sodium hydroxide solution constitutes the invention of copending application Ser. No. 100,083. Where such leaching is carried out with sulfide-lean white liquor concentrated in accordance with this invention and recycled by lines 40 and 44, then as the sodium sulfide is dissolved from the smelt, more sodium chloride and sodium carbonate are deposited from the liquor and these deposited salts are forwarded with the material remaining from the smelt after leaching.

Liquid effluent from the leacher 12 exits through line 14 and consists of white liquor where the leaching occurs with recycled sodium hydroxide solution alone or both recycled sodium hydroxide solution and sodium sulfide solution. The liquid effluent from the smelt leacher 12 may be recycled through line 16 to the smelt leacher 12.

The preferential dissolving of sodium sulfide from a sodium chloride-containing smelt constitutes the invention of application Ser. No. 99,968.

A solid residue consisting of substantially sodium carbonate and sodium chloride and any undissolved sodium sulfide, is fed from the smelt leacher 12 by line 18 to a smelt residue leacher 20.

The sodium carbonate and sodium chloride may be separated from the sodium sulfide by the alternative procedure outlined above, i.e. formation of green liquor in the normal way from the smelt followed by evaporative crystallization of sodium carbonate and sodium chloride.

The smelt residue is contacted in leacher 20 by water fed through line 22 and a recycled solution of sodium carbonate and sodium chloride fed through line 24.

Such recycle of sodium carbonate and sodium chloride solution constitutes the invention of copending application Ser. No. 100,082.

The water fed through line 22 may be at least partially and for economic reasons preferably is partially bleach plant water effluent. Calcium carbonate mud wash water also may form part of the water feed. Preferably, the water fed through line 22 consists partially of bleach plant water effluent and partially of mud wash water. As indicated below, the mud wash water preferably is bleach plant effluent, and, therefore, in effect, the water in line 22 in this preferred embodiment is all bleach plant effluent.

The resulting sulfide-lean green liquor is fed through line 26 to a causticizer 28. The green liquor is causticized with lime fed through line 30. The sodium carbonate thereby substantially is converted to sodium hydroxide and calcium carbonate precipitates as a mud.

Dregs from the residue leacher 20 may be fed to a dregs washer (not shown) and washed therein. The remaining solids may be passed to a sewer as a slurry. The wash water fed to the dregs washer may be effluent water from a bleaching plant.

The reaction between the lime and the sodium carbonate is incomplete and therefore the sodium hydroxide solution formed contains unreacted sodium carbonate in addition to sodium chloride.

The calcium carbonate mud leaves the causticizer 28 by line 36, is washed, preferably with bleach plant effluent, and reconverted to lime in conventional manner. The mud wash water then may be fed to the smelt residue leacher 20 as described above.

The sodium hydroxide solution formed in the causticizer 28 is fed by line 32 to an evaporator 34. In the evaporator 34, the sodium hydroxide solution is subjected to concentration in accordance with the present invention and the resulting water vapor leaves by line 38. The evaporator may be maintained under a reduced pressure to lower the boiling point of the solution. Such water vapor is condensed and may be used as wash water in a bleach plant, so that part of the spent wash water from the bleach plant is substantially purified and returned to the bleach plant as fresh wash water.

This evaporation is continued to induce crystallization of at least part of the sodium chloride and sodium carbonate contents of the sodium hydroxide solution. Such crystallization may be carried out in a single step, in which case a mixture of sodium carbonate and sodium chloride is precipitated, or in two steps in which case pure sodium chloride first is precipitated and then a mixture of sodium carbonate and sodium chloride is precipitated. In the single step case, sodium chloride first is precipitated and subsequently a mixture but no attempt is made to recover the sodium chloride first precipitated.

The white liquor so produced, having a reduced sodium chloride content, is fed from the evaporator 34 by line 40 to admix with sodium sulfide solution from the smelt leacher 12 to form a white liquor containing sodium hydroxide and sodium sulfide, which is fed by line 42 to a digester (not shown). It may be necessary to dilute this latter white liquor prior to feed to the digester. Bleach plant effluent may be used to achieve such dilution. Alternatively, at least part of the sodium hydroxide solution may be used to leach the smelt and is fed by line 44 to the smelt leacher 12 for this purpose.

The crystallized sodium chloride and sodium carbonate mixture is fed from the evaporator 34 by line 46 to a separator 48. In the case where the evaporation of the sodium hydroxide solution occurs in two stages, the pure sodium chloride is first removed from the evaporator and then the mixture of sodium chloride and sodium carbonate passed to the separator 48.

In the separator 48, the mixture of sodium chloride and sodium carbonate is contacted with water fed through line 50. The sodium carbonate and part of the sodium chloride are preferentially dissolved leaving substantially pure sodium chloride which is removed from the separator through line 52 as a cake for further purification and later use, such as in the formation of chlorine dioxide and chlorine, the formation of sodium chlorate or the formation of sodium hydroxide by electrolysis.

The resulting aqueous solution of sodium carbonate and sodium chloride is recycled by line 24 to the smelt residue leacher 20.

The water fed by line 50 to the separator 48 may be bleach plant effluent, usually as part of the wash water used to wash the lime mud.

Other minor refinements of the operation just described may be made, and such refinements lead to water economy. For example, the effluent from the smelt leacher 12 consists of a slurry of sodium chloride and sodium carbonate in sodium sulfide. After separation of the sodium sulfide, the resulting solids may be subjected to displacement washing by water. Such water may be bleach plant effluent and preferably is part of the spent dregs wash water and part of the water obtained from calcium carbonate mud dewatering. Where such dregs and mud wash waters are bleach plant effluent, then the BPE is providing the source of a further water requirement of the system.

Calcium carbonate mud precipitated in causticizer 28 may be mixed with part of the spent dregs wash water and passed to a storage area. In the storage area, the mud may be repulped by admixture with bleach plant effluent water, and the slurry so obtained passed to a mud dewaterer wherein water is recovered from the slurry. The resulting thick slurry then is passed to a roaster to reform the lime. The carbon dioxide and water vapor formed in the roaster may be vented to atmosphere.

The water recovered in the mud dewaterer may be used partially as already described as part of the feed water in line 22 and to slurry the sodium carbonate and sodium chloride. In addition, such water may be partially used in other refinements of the operation. Thus, the solution formed in the evaporator 34 may be removed as a slurry of sodium carbonate and sodium chloride in sodium hydroxide. The solids are separated and the sodium hydroxide solution passed for further use as described above. The solids may be washed by displacement washing with part of the wash water from the mud dewaterer.

It will be seen that a combination of these refinements leads to economic utilization of water and fully integrates the operation with effluent water from a bleach plant, using as the only water supply bleach plant effluent and completely eliminating the discharge of harmful pollutants from the bleach plant.

In an alternative embodiment of the form of the invention shown in FIG. 1, the white liquor having a reduced sodium chloride content in line 40 may be used to prepare caustic extraction and sodium hypochlorite solutions for the bleach plant. Further, the sulfide-lean green liquor in line 26 may be employed to prepare sodium hydrosulfite from zinc hydrosulfite.

Turning now to the embodiment of FIG. 2, this is similar to FIG. 1, except that the sodium chloride-lean white liquor is not utilized to fractionate the smelt. Smelt from a furnace of a Kraft mill recovery system containing sodium sulfide, sodium chloride and sodium carbonate, is fed by line 110 to a smelt leacher 112. The smelt, which may be wooled initially by the action of steam, is leached with water fed through line 114. Liquid effluent, generally consisting of an aqueous solution of sodium sulfide, exits through line 116. It may be necessary to recycle the sodium sulfide solution in line 116 to the leacher to build up the sodium sulfide content to the desired level.

The water fed through line 114 may be at least partially and preferably is bleach plant effluent.

A solid residue consisting of substantially sodium carbonate and sodium chloride, together with any undissolved sodium sulfide, is fed from the smelt leacher 112 by line 118 to a smelt residue leacher 120. The smelt residue is contacted in leacher 120 by water fed by line 122 and a recycled solution of sodium carbonate and sodium chloride fed through line 124.

The water fed through line 122 preferably is bleach plant effluent. The bulk of the bleach plant effluent used in line 122 is passed directly to the smelt residue leacher, and the remainder is passed thereto after being utilized as calcium carbonate mud wash water.

The resulting sulfide-lean green liquor is fed through line 126 to a causticizer 128. The green liquor is causticized with lime led through line 130. The sodium carbonate thereby substantially is converted to sodium hydroxide and calcium carbonate precipitates as a mud.

The calcium carbonate mud leaves the causticizer 128 by line 132, is washed, preferably with bleach plant effluent, and reconverted to lime in conventional manner.

The sodium hydroxide solution produced in the causticizer contains some unreacted sodium carbonate since the reaction between the lime and the sodium carbonate is incomplete.

The sodium hydroxide solution is fed by line 134 to an evaporator 136. In the evaporator 136, the sodium hydroxide solution is subjected to concentration in accordance with the present invention and the resulting water vapor leaves by line 138. This water vapor is condensed and the water may be used as wash water in a bleach plant.

The evaporation concentrates the sodium hydroxide until crystallization of sodium chloride and sodium carbonate occurs to the extent required. The white liquor produced having a reduced sodium chloride content is fed from the evaporator 136 by line 140 to mix with the sodium sulfide solution in line 116 to provide a white liquor in line 142 suitable for use as pulping liquor in a Kraft mil digester (not shown), optionally after dilution. Where such dilution occurs, it is preferably achieved by using bleach plant effluent.

The crystallized sodium chloride and sodium carbonate mixture is fed from the evaporator 136 by line 144 to a separator 146. In the separator 146, the mixture of sodium chloride and sodium carbonate is contacted with water fed by line 148, preferably the mud wash water. The sodium carbonate and part of the sodium chloride are dissolved preferentially leaving substantially pure sodium chloride which is removed from the separator 146 through line 150 as a cake for further purification and later use.

As in the embodiment of FIG. 1, the evaporation in evaporator 136 may have been conducted in such a manner to recover part of the sodium chloride in substantially pure form.

The resultant solution of sodium carbonate and sodium chloride passes from the separator 146 by line 124 to smelt residue leacher 120.

A number of modifications and minor refinements are discussed above with reference to FIG. 1 and these modifications and minor refinements, as applicable, may be utilized with this embodiment.

Considering now FIG. 3, this embodiment is similar to that of FIG. 1, with the exception that the smelt is not subjected to a fractionation prior to the formation of the green liquor. Smelt from the furnace of a Kraft mill recovery system is fed by line 210 to a smelt dissolver 212. The smelt includes sodium sulfide, sodium carbonate and sodium chloride.

Water, preferably bleach plant effluent, is fed by line 214 together with a recycled solution of sodium carbonate and sodium chloride in line 216 to the smelt dissolver 212 and the smelt is dissolved therein to form a green liquor which passes by line 218 to a causticizer 220.

The green liquor is causticized with lime fed through line 222. The sodium carbonate thereby is substantially converted to sodium hydroxide and calcium carbonate precipitates as a mud. The calcium carbonate mud leaves the causticizer 220 by line 223, is washed and reconverted to lime in conventional manner.

The resultant white liquor contains sodium hydroxide, sodium sulfide, sodium chloride and unconverted sodium carbonate. The white liquor is passed by line 224 to an evaporator 226. Upon evaporation of sufficient water from this solution in accordance with the present invention, sodium chloride and sodium carbonate precipitated from the white liquor, to provide a white liquor having a reduced sodium chloride content. This white liquor passes out of the evaporator 226 by line 228 for feed to a digester (not shown), optionally after dilution, preferably with bleach plant effluent.

The water evaporated from the white liquor leaves the evaporator through line 230 and after condensation may be used as fresh wash water in a bleach plant.

The solid mixture of sodium carbonate and sodium chloride precipitated from the white liquor may be passed by line 232 to a separator 234 wherein the mixture is contacted with water, preferably bleach plant effluent, fed by line 236.

The sodium carbonate and part of the sodium chloride are dissolved from the mixture and the resulting aqueous solution passes by line 216 to the smelt dissolver 212. The remaining sodium chloride is recovered through line 238 as a cake and may be subjected to processing for further use, such as in the production of chlorine dioxide and chlorine.

As in the case of FIG. 1, the evaporation may be carried out and deposited material recovered so that substantially pure sodium chloride is first recovered and subsequently a mixture of sodium carbonate and sodium chloride is deposited.

A number of modifications and minor refinements are discussed above with reference to FIG. 1 and these modifications and minor refinements, as applicable, may be utilized with this embodiment.

By reducing the quantity of sodium chloride in the recycling white liquor in the manner described above, exposure of the digester, the black liquor evaporator and the furnace to high concentrations of chloride is avoided.

The invention is illustrated further by the following examples:

EXAMPLE I

Utilizing experimental observations of solubility a mass balance for a typical arrangement was arrived at for the embodiment of the invention illustrated in FIG. 1. All quantities are pounds weight per theoretical ton of pulp. In the following calculation, perfect solid phase/aqueous phase separation is assumed for convenience.

A typical Kraft mill recovery system smelt contains 195 lbs. $Na_2S$, 225 lbs. NaCl and 808 lbs. $Na_2CO_3$. The sodium chloride is 120 lbs. from recycle and 115 lbs. from bleach plant effluent. In arriving at this mass balance, it is assumed, for the sake of convenience, that the bleach plant effluent has been added to the black liquor and hence the sodium chloride content of the effluent appears in the smelt. This material is leached with sodium hydroxide solution fed by lines 40 and 44, and as will become apparent, this solution contains 1870 lbs. water, 600 lbs. NaOH, 249 lbs. NaCl and 61 lbs. $Na_2CO_3$. It has been observed experimentally that this solution is saturated at 50° C. with respect to both sodium chloride and sodium carbonate. Upon contact of this solution with the sodium sulfide containing smelt, sodium sulfide is dissolved from the smelt and an equivalent quanity of sodium chloride and sodium carbonate are deposited from the solution, so that the resulting pulping liquor contains 1735 lbs. water, 600 lbs. NaOH, 195 lbs. $Na_2S$, 110 lbs. NaCl and 13 lbs. $Na_2CO_3$. This latter solution has been found experimentally to be saturated with respect to both sodium chloride and sodium carbonate.

The smelt residue fed by line 18 to the smelt residue leacher 20 contains 364 lbs. NaCl, 856 lbs. $Na_2CO_3$ and 135 lbs. water as water of crystallization of the sodium carbonate. The residue is contacted with 2640 lbs. water fed by line 22 and recycle solution in line 24 containing 624 lbs. water, 147 lbs. NaCl and 134 lbs. $Na_2CO_3$. The recycle solution has been observed experimentally to be saturated with respect to sodium chloride at 30° C. The resulting green liquor in line 26 contains 3400 lbs. water, 511 lbs. NaCl and 990 lbs. $Na_2CO_3$. This solution was found to be unsaturated at 30° C.

Assuming 80% efficiency in causticization, the white liquor in line 32 formed by causticization of the green liquor contains 3592 lbs. water, 600 lbs. NaOH, 511 lbs. NaCl and 197 lbs $Na_2CO_3$. The increase in the quantity of water in line 32 as compared to line 26 is water gained from mud washing and is included for convenience. This solution was found to be unsaturated at 50° C. This solution is boiled under reduced pressure to evaporate 1700 lbs. water therefrom and thereby precipitate 262 lbs. NaCl and 134 lbs. $Na_2CO_3$. This precipitated material passes to separator 48 together with 23 lbs. of water as water of crystallization of sodium carbonate. Therefore, the solution recycled by line 40, as already indicated, contains 1870 lbs. water, 600 lbs. NaOH, 249 lbs. NaCl and 61 lbs. $Na_2CO_3$.

To the sodium chloride and sodium carbonate mixture in the separator was added 601 lbs. water to form a solution of sodium carbonate and sodium chloride containing as indicated previously, 624 lbs. water, 147 lbs. NaCl and 134 lbs. $Na_2CO_3$, leaving 115 lbs. NaCl which is recovered through line 52 for further use.

It is apparent, therefore, that 115 lbs. of sodium chloride introduced to the smelt other than by pulping liquor recycle is removed from the system.

EXAMPLE II

A mass balance for a typical arrangement was arrived at for the embodiment of FIG. 2, utilizing experimental observations. As in the case of Example 1, for convenience, perfect solid phase/aqueous phase separation is assumed.

A typical Kraft mill recovery operation smelt containing 195 lbs. $Na_2S$, 235 lbs. NaCl and 815 lbs. $Na_2CO_3$ is contacted with 690 lbs. water fed by line 114 to leach sodium sulfide and part of the sodium chloride and sodium carbonate from the smelt to yield a solution in line 116 containing 550 lbs. water, 195 lbs. $Na_2S$, 35 lbs. NaCl and 7 lbs. $Na_2CO_3$. This solution was found to be saturated with respect to both sodium chloride and sodium carbonate at 50° C.

The residual solid mixture contains 200 lbs. NaCl, 808 lbs. $Na_2CO_3$ and 140 lbs. water as water of crystallization of the sodium carbonate. After passage by line 118 to the smelt residue leacher 120, the mixture is contacted with 2522 lbs. water fed by line 122 and a recycle solution of sodium chloride and sodium carbonate containing 848 lbs. water, 200 lbs. NaCl and 182 lbs. $Na_2CO_3$ fed by line 124. This latter solution has been found to be saturated with respect to sodium chloride at 30° C.

This provides a green liquor containing 3510 lbs. water, 400 lbs. NaCl and 990 lbs. $Na_2CO_3$. This solution was found to be unsaturated with respect to either sodium chloride or sodium carbonate at 30° C. After causticization at 80% efficiency, in causticizer 128, and separation of the calcium carbonate mud formed thereby, the resultant white liquor contains 3703 lbs. water, 600 lbs. NaOH, 400 lbs. NaCl and 197 lbs. $Na_2CO_3$. The increase in the quantity of water is due to water gained from mud washing.

The white liquor is evaporated in the evaporator 136 to remove 2482 lbs. of water from the liquor and to deposit therefrom 315 lbs. sodium chloride and 182 lbs. sodium carbonate. The resulting concentrated white liquor contains 1190 lbs. water, 600 lbs. NaOH, 85 lbs. NaCl and 15 lbs. $Na_2CO_3$ and this solution was observed experimentally to be saturated with respect to both sodium chloride and sodium carbonate at 50° C.

The concentrated white liquor was passed through line 140 to mix with sodium sulfide solution in line 116 to provide a pulping liquor in line 142 containing 1740 lbs. water, 600 lbs. NaOH, 195 lbs. $Na_2S$, 120 lbs. NaCl and 22 lbs. $Na_2CO_3$. It was found that this solution was supersaturated with respect to sodium chloride and sodium carbonate at 50° C. and therefore in this operation it is necessary either to dilute the water liquor in line 140 prior to mixing the sodium sulfide solution, or to mix the two solutions and remove precipitated sodium chloride and sodium carbonate prior to use as pulping liquor.

The residue from the evaporator 136 consisting of 315 lbs. NaCl, 182 lbs. $Na_2CO_3$ and 31 lbs. of water as water of crystallization of sodium carbonate is passed to a separator 146 wherein it is contacted with 817 lbs. water to form the recycle solution in line 124. 115 lbs. of sodium chloride is recovered through line 152.

In this way, a considerable quantity of sodium chloride introduced into the system with the smelt is removed and is not recycled with the pulping liquor to the digester.

EXAMPLE III

Experimental observations of solubilities were utilized to determine a mass balance for the embodiment of FIG. 3. As in the case of Example I, for convenience, perfect solid phase/aqueous phase separation is assumed.

A typical Kraft mill recovery system smelt containing 195 lbs. $Na_2S$, 225 lbs. NaCl and 808 lbs. $Na_2CO_3$ is dissolved in the smelt dissolver 212 in 4129 lbs. of water fed by line 214 and a recycle solution fed by line 216 containing 857 lbs. water, 202 lbs. NaCl and 184 lbs. $Na_2CO_3$ to provide a green liquor in line 218 containing 4986 lbs. $H_2O$, 195 lbs. $Na_2S$, 427 lbs. NaCl and 992 lbs. $Na_2CO_3$. The recycle solution was found to be saturated with sodium chloride at 30° C. The green liquor was found to be unsaturated at 50° C.

Causticization of the sodium carbonate content of the green liquor at approximately 80% efficiency and after separation of calcium carbonate mud yields a white liquor containing 5181 lbs. water, 600 lbs. NaOH, 195 lbs. $Na_2S$, 427 lbs. NaCl and 197 lbs. $Na_2CO_3$. The white liquor in line 224 is unsaturated with respect to the dissolved salts at 50° C. The increase in water quantity is from mud washing.

It is indicated above that it was preferred to fractionate the smelt to remove substantially the sodium sulfide prior to formation of the green liquor, since the quantity of water required in such a case is substantially reduced for the production of an equivalent quantity of sodium hydroxide.

Comparison of the quantities of water present in the white liquor in line 224 in this example and that present in line 32 in Example I will indicate that this statement is correct.

Water is evaporated from the white liquor in the evaporator 226 and a mixture of sodium carbonate and sodium chloride is deposited therefrom. The water vapor in line 230 is condensed to yield 3415 lbs. water.

The resulting pulping liquor in line 228 contains 1735 lbs. water, 600 lbs. NaOH, 195 lbs. $Na_2S$, 110 lbs. NaCl and 13 lbs. $Na_2CO_3$. This solution was found to be saturated with respect to both sodium chloride and sodium carbonate at 50° C.

The solid mixture deposited from the white liquor contains 317 lbs. NaCl, 184 lbs. $Na_2CO_3$ and 31 lbs. water as water of crystallization of the sodium carbonate. After passing to the separator 234, the mixture is contacted with 826 lbs. water to form the recycle solution of line 216. 115 lbs. of pure sodium chloride is removed from the separator by line 238 for further use. Thus, again it is demonstrated to be possible to remove some sodium chloride present in the smelt from the system, so that the removed sodium chloride is not recycled with the white liquor to the digester of the mill.

It is to be noted that the quantities of water to be evaporated in the systems of the three examples vary. In Example I, the quantity is 1700 lbs., in Example II the quantity is 2482 lbs. and in Example III, 3415 lbs. These results indicate the increased efficiency in the case of Example I over Example II and in turn over Example III.

The integrated system outlined above is extremely flexible and modifications may be made thereto to suit individual requirements without departing from the scope of the invention.

What we claim is:

1. In a process of pulping cellulosic fibrous material with a pulping liquor, the improvement which comprises concentrating dissolved sodium chloride-containing white liquor to deposit sodium chloride therefrom and to provide a white liquor having a reduced dissolved sodium chloride content, separating said deposited sodium chloride from the latter white liquor, and thereafter utilizing said white liquor having a reduced dissolved sodium chloride content as at least part of said pulping liquor.

2. A process of pulping cellulosic fibrous material including the steps of contacting said cellulosic fibrous material with a pulping liquor, separating pulped material from spent pulping liquor, forming a sodium chloride-containing smelt from said pulping liquor forming a white liquor containing dissolved sodium chloride from said smelt, concentrating said white liquor to deposit sodium chloride therefrom and removing said deposited sodium chloride from the resulting white liquor.

3. In a Kraft mill process of pulping cellulosic fibrous material, including the steps of contacting said cellulosic fibrous material with a pulping liquor containing sodium sulfide and sodium hydroxide, separating pulped material from black liquor, evaporating said black liquor, forming a sodium chloride-, sodium sulfide- and sodium carbonate-containing smelt from said evaporated black liquor, dissolving said smelt to provide a green liquor and causticizing said green liquor and thereby forming a white liquor, the improvement which comprises concentrating said white liquor to deposit sodium chloride therefrom and provide a pulping liquor having a reduced sodium chloride-content, removing said deposited sodium chloride from said latter pulping liquor, and recyling said latter pulping liquor to said contacting step.

4. In a Kraft mill process of pulping cellulosic fibrous material including the steps of contacting said cellulosic fibrous material with a white liquor containing sodium sulfide and sodium hydroxide, separating pulped material from black liquor, evaporating said black liquor, forming a smelt from said evaporated black liquor, said smelt containing sodium chloride, sodium carbonate and sodium sulfide, forming from said smelt an aqueous solution of sodium sulfide and a solid residue containing sodium carbonate and sodium chloride, forming a sulfide-lean green liquor from said residue and causticizing a said green liquor thereby forming a sulfide-lean white liquor containing sodium chloride, the improvement which comprises concentrating said sulfide-lean white liquor to deposit sodium chloride therefrom and removing said deposited sodium chloride from the resulting white liquor.

5. The process of claim 4 including the steps of subsequently combining said concentrated white liquor having a reduced sodium chloride content with said aqueous solution of sodium sulfide to provide a pulping liquor having a reduced sodium chloride content, and recycling said latter pulping liquor to said contacting step as at least part of said white liquor.

6. The process of claim 3 wherein said white liquor is concentrated by evaporation.

7. The process of claim 3 wherein said white liquor is concentrated by boiling under reduced pressure.

8. In a Kraft mill process of pulping cellulosic fibrous material including the steps of contacting said cellulosic fibrous material with a white liquor containing sodium sulfide and sodium hydroxide, separating pulped material from black liquor, evaporating said black liquor, forming a smelt from said evaporated black liquor, said smelt containing sodium sulfide, sodium carbonate and sodium chloride, forming from said smelt an aqueous solution of sodium sulfide and a solid residue containing sodium carbonate and sodium chloride, dissolving said solid residue with aqueous material to form a sulfide-lean green liquor, and causticizing said green liquor thereby forming a sulfide-lean white liquor containing sodium chloride and uncausticized sodium carbonate, the improvement which comprises concentrating said sulfide-lean white liquor to deposit sodium chloride and sodium carbonate therefrom, and separating said deposited sodium chloride and sodium carbonate from the resulting white liquor.

9. The process of claim 8 wherein said sulfide-lean white liquor is concentrated to deposit a mixture of sodium carbonate and sodium chloride, and said mixture is removed from the concentrated white liquor.

10. The process of claim 9 wherein said removed mixture is subjected to leaching to provide a solution of sodium carbonate and sodium chloride leaving substantially pure sodium chloride.

11. The process of claim 8 wherein said white liquor is concentrated in two steps, to deposit in the first step substantially pure sodium chloride, said substantially pure sodium chloride being removed from the white liquor resulting from the first step concentration, and in the second step a mixture of sodium carbonate and sodium chloride, said mixture being removed from the white liquor resulting from the second step concentration.

12. In a Kraft mill process of pulping cellulosic fibrous material, including the steps of contacting said cellulosic fibrous material with a pulping liquor containing sodium sulfide and sodium hydroxide, separating pulped material from black liquor, evaporating said black liquor, forming a sodium sulfide- and sodium carbonate-containing smelt from said evaporated black liquor, dissolving said smelt to provide a green liquor, causticizing said green liquor to form a white liquor and recycling said white liquor to said contacting step as at least part of said pulping liquor, the improvement which comprises providing dissolved sodium chloride in said white liquor, evaporating said white liquor to deposit therefrom sodium chloride, separating said deposited sodium chloride from said evaporated white liquor, and utilizing said evaporated white liquor as said recycled white liquor.

13. The process of claim 12 wherein said pulped material is passed to a bleach plant wherein said pulped material is subjected to a succession of bleaching operations and intermediate washing and caustic extraction operations, introducing aqueous bleach plant effluents into the recovery operation defined by said steps of evaporating said black liquor, forming said smelt, providing said green liquor and causticizing said green liquor, whereby at least part of said dissolved sodium chloride is provided in said white liquor.

14. The process of claim 13 wherein said white liquor is concentrated by evaporation.

15. The process of claim 13 wherein said white liquor is concentrated by boiling under a reduced pressure.

16. The process of claim 1 wherein said white liquor is concentrated by evaporation.

17. The process of claim 2 wherein said white liquor is concentrated by evaporation.

18. The process of claim 4 wherein said white liquor is concentrated by evaporation.

19. The process of claim 1 wherein said white liquor is concentrated by boiling under a reduced pressure.

20. The process of claim 2 wherein said white liquor is concentrated by boiling under a reduced pressure.

21. The process of claim 4 wherein said white liquor is concentrated by boiling under a reduced pressure.

22. The process of claim 8 wherein said concentrated white liquor is subsequently combined with said aqueous solution of sodium sulfide to provide a pulping liquor, and recycling said pulping liquor to said contacting step as at least part of said white liquor.

23. A Kraft mill process of pulping cellulosic fibrous material including the steps of contacting said cellulosic fibrous material with a white liquor containing sodium sulfide and sodium hydroxide, separating pulped material from black liquor, evaporating said black liquor, forming a smelt from said evaporated black liquor, said smelt containing sodium chloride, sodium carbonate and sodium sulfide, contacting said smelt with a relatively concentrated solution of sodium hydroxide to dissolve said sodium sulfide from said smelt and form a solid residue containing said sodium carbonate and sodium chloride, forming a sulfide-lean green liquor from said residue, causticizing said green liquor thereby forming a sulfide-lean white liquor containing sodium chloride, concentrating said sulfide-lean white liquor to deposit sodium chloride therefrom, removing said deposited sodium chloride from the concentrated white liquor, thereafter utilizing said concentrated white liquor as said relatively concentrated solution of sodium hydroxide, and recycling the aqueous solution of sodium sulfide and sodium hydroxide as at least part of said pulping liquor in said contacting step.

24. A Kraft mill process of pulping cellulosic fibrous material including the steps of contacting said cellulosic fibrous material with a pulping liquor containing sodium sulfide and sodium hydroxide, separating pulped material from black liquor, evaporating said black liquor, forming a sodium sulfide- and sodium carbonate-containing smelt from said evaporated black liquor, dissolving said smelt to provide a green liquor, causticizing said green liquor and thereby forming a white liquor, introducing a sodium chloride-containing aqueous medium to said black liquor whereby said smelt, green liquor and white liquor contain sodium chloride, concentrating said white liquor to deposit sodium chloride therefrom and provide a pulping liquor having a reduced sodium chloride content, removing said deposited sodium chloride from said latter pulping liquor and subsequently recycling said pulping liquor having a reduced sodium chloride content to said contacting step as at least part of said pulping liquor.

25. The process of claim 24 wherein said sodium chloride-containing medium is aqueous bleach plant effluent.

26. A Kraft mill process of pulping cellulosic fibrous material including the steps of contacting said cellulosic fibrous material with a pulping liquor containing sodium sulfide and sodium hydroxide, separating pulped material from black liquor, evaporating said black liquor, forming a sodium sulfide- and sodium carbonate-containing smelt from said evaporated black liquor, dissolving said smelt in an aqueous material constituted at least in part by a sodium chloride-containing aqueous medium to provide a green liquor having sodium chloride dissolved therein, causticizing said green liquor to form a white liquor, and concentrating said white liquor to deposit sodium chloride therefrom and to provide a pulping liquor having a reduced sodium chloride-content, removing said deposited sodium chloride from said latter pulping liquor and recycling said pulping liquor having a reduced sodium chloride content to said contacting step as at least part of said pulping liquor.

27. The process of claim 26 wherein said sodium chloride-containing aqueous medium is bleach plant effluent.

References Cited

UNITED STATES PATENTS

| | | | |
|---|---|---|---|
| 3,366,534 | 1/1968 | Rapson | 162—30 |
| 3,617,434 | 11/1971 | Nakafuri et al. | 162—30 |
| 3,560,329 | 2/1971 | Nelson et al. | 162—30 |
| 3,347,739 | 10/1967 | Tomlinson | 162—30 |
| 3,268,388 | 8/1966 | Bauman et al. | 162—30 |
| 2,862,887 | 12/1958 | Boyer | 162—30 |
| 1,743,080 | 1/1930 | Bradley et al. | 23—48 X |
| 3,258,391 | 6/1966 | Cornell et al. | 162—30 |
| 3,453,174 | 7/1969 | Rapson | 162—30 |

S. LEON BASHORE, Primary Examiner

A. D'ANDREA, JR., Assistant Examiner

U.S. Cl. X.R.

162—30; 423—207